United States Patent
Debut et al.

(10) Patent No.: US 8,189,979 B2
(45) Date of Patent: May 29, 2012

(54) BUFFERED OPTICAL FIBRE AND METHOD FOR IMPROVING THE LIFETIME THEREOF

(75) Inventors: Alexis Debut, Milan (IT); Davide Sarchi, Milan (IT); Enrico Consonni, Milan (IT); Martino Travagnin, Milan (IT)

(73) Assignee: Prysmian S.p.A., Milan (IT)

( * ) Notice: Subject to any disclaimer, the term of this patent is extended or adjusted under 35 U.S.C. 154(b) by 521 days.

(21) Appl. No.: 12/311,210

(22) PCT Filed: Sep. 25, 2006

(86) PCT No.: PCT/EP2006/066693
§ 371 (c)(1),
(2), (4) Date: Mar. 23, 2009

(87) PCT Pub. No.: WO2008/037291
PCT Pub. Date: Apr. 3, 2008

(65) Prior Publication Data
US 2009/0274424 A1 Nov. 5, 2009

(51) Int. Cl.
*G02B 6/02* (2006.01)
(52) U.S. Cl. .................................................. 385/128
(58) Field of Classification Search .................. 385/128
See application file for complete search history.

(56) References Cited

U.S. PATENT DOCUMENTS

| | | | |
|---|---|---|---|
| 4,098,762 A | 7/1978 | Miyata et al. | |
| 4,145,404 A | 3/1979 | Miyata et al. | |
| 5,042,907 A | 8/1991 | Bell et al. | |
| 5,444,809 A * | 8/1995 | Aoki et al. | 385/128 |
| 5,707,732 A * | 1/1998 | Sonoda et al. | 428/357 |
| 6,215,931 B1 | 4/2001 | Risch et al. | |
| 7,295,737 B2 * | 11/2007 | Moorjani et al. | 385/123 |
| 2003/0133679 A1 | 7/2003 | Murphy et al. | |
| 2004/0175086 A1 | 9/2004 | Reith et al. | |

FOREIGN PATENT DOCUMENTS

| | | |
|---|---|---|
| EP | 0 345 968 | 12/1989 |
| EP | 0 530 940 A1 | 3/1993 |
| EP | 0 780 425 A1 | 6/1997 |
| WO | WO-01/05724 A2 | 1/2001 |
| WO | WO-2004/066007 A1 | 8/2004 |
| WO | WO-2006/036057 A1 | 4/2006 |

OTHER PUBLICATIONS

"Characteristics of a Single-Mode Optical Fibre Cable", International Telecommunication Union, ITU-T, Telecommunication Standardization Sector of ITU, Series G: Transmission Systems and Media, Digital Systems and Networks, Transmission media Characteristics—Optical Fibre Cables, G.652, pp. i-iv, and 1-16, (2000).
Davis et al., "Optical Fibres Resilient to Failure in Bending Under High Power", ECOC 2005 Proceedings, vol. 3, pp. 471-472, (2005).
Sikora et al., "Reduction in Fibre Reliability Due to High Optical Power", Electronics Letters, vol. 39, No. 14, pp. 1-2, (2003).

* cited by examiner

*Primary Examiner* — Omar Rojas
(74) *Attorney, Agent, or Firm* — Finnegan, Henderson, Farabow, Garrett & Dunner, L.L.P.

(57) ABSTRACT

A buffered optical fiber includes an optical waveguide, at least one exterior coating surrounding the optical waveguide and a buffer coating surrounding the at least one exterior coating, wherein the buffer coating is a tight buffer coating made of a material having a density of at least about 1.2 $Kg/dm^3$, a thermal conductivity of at least about 0.4 W/m·K and includes a polymeric matrix and an inorganic filler.

33 Claims, 1 Drawing Sheet

BUFFERED OPTICAL FIBRE AND METHOD FOR IMPROVING THE LIFETIME THEREOF

CROSS REFERENCE TO RELATED APPLICATION

This application is a national phase application based on PCT/EP2006/066693, filed Sep. 25, 2006, the content of which is incorporated herein by reference.

BACKGROUND OF THE INVENTION

1. Field of the Invention

The present invention relates to a buffered optical fibre and a method for improving the lifetime thereof.

More particularly, the present invention relates to a buffered optical fibre comprising a tight-buffer coating and a method for improving the lifetime thereof under high power and small diameter bend improving the energy removal therefrom.

2. Description of Related Art

An optical fibre generally comprises a core surrounded by a cladding (hereinafter both collectively referred to as "optical waveguide"), said core and cladding being preferably made of glass, and at least one exterior coating.

In many instances, the exterior coatings are two. The exterior coating directly contacting the optical waveguide is called "first coating" or "primary coating" and the exterior coating overlying the first one is called "second coating" or "secondary coating". Typically, said first and second coatings are made of polymer material.

Certain applications require the optical fibre to be further coated by a buffer coating provided over the at least one exterior coating.

Typically, a buffered optical fibre can be used as semi-finished component to form a cable in association with other components as required by the use.

In some applications, the buffered optical fibre can be used as such to act as a cable. Examples of these applications are indoor and premises applications, cable termination, pigtails, patchcords and, more generally, those applications implying the optical fibre to be subjected to additional mechanical and friction stress often repeated in time.

When said buffer coating is provided in contact with the at least one exterior coating it is said "tight buffer", when said buffer coating is in form of a tube having an internal diameter larger than the overall external coating diameter it is said "loose buffer".

Sikora et al. ("Reduction in fibre reliability due to high optical power", Electronics Letters, 10 Jul. 2003, vol. 39, No. 14) disclose that high power, 180° bend tests in samples of singlemode optical fibre show that some fibres can suffer catastrophic damage at optical power as low as 0.5 W at bend diameters of 13 mm. Damage at fibre bends is driven by an increase in temperature when power lost at the bend is absorbed by the coating.

The phenomenon caused, e.g., by the accidental bending of a fibre in loops with small radius, or by an excess of power transmitted can be also referred to as "thermal runaway". Part of the guided light beam escapes from the fibre core and crosses the protective layers, where it is at least partially absorbed, and the absorption process heats the coating materials.

US 2004/0175086 teaches that a portion of the input light energy can be incident on the core/cladding interface at an angle less than the critical angle of incidence. Upon such an occurrence, this light energy passes from the core and continues through the interface between the cladding and the coating, because the conventional coating has a higher index of refraction than that of the cladding. This light energy may be absorbed by the coating or any surrounding materials and converted into heat energy. The heat energy can cause localized damage to the optical fibre and surrounding materials, which significantly reduces the operational life of the fibre. This is particularly consequential in high-power applications, such as but not limited to those where the transmission signal has a power above 0.5 W. Also, a severe bend, such as one having a radius or kink smaller than about 10 mm, may cause signal energy propagating along the core to be injected into the cladding. Again, the escaping light energy is converted to heat upon leaving the cladding, which can overheat a localized portion of the optical transmission fibre, resulting in premature failure.

US 2004/0175086 suggests to solve this problem with an optical transmission fibre, comprising:
a core having a first index of refraction;
a cladding material located around said core and having a second index of refraction less than said first index of refraction;
a first coating material located around a first portion of said cladding material and having a third index of refraction greater than the second index of refraction; and
a second coating material located around a second portion of said cladding material and having a fourth index of refraction less than said second index of refraction.

The Applicant observes that a drawback of this fibre is the need of carefully selecting refraction indexes of the coating layers sharply limits the choice of the first and second coating materials. Furthermore, this fibre has also the drawback that it cannot be "upjacketed" with a tight-buffer coating which would hinder dissipation of the light energy escaping the second coating material.

WO 2004/066007 teaches an optical fibre that can stabilize and propagate high-power light without causing damage and the like to the optical fibre even if the optical fibre is temporarily bent with small curvature diameters, through the use of coating material with little absorption of the escaped light in the optical fibre, in particular through the use of transparent UV-cured resin as the coating material. Alternatively, the coating layer of the optical fibre is formed by a primary coating layer made of ultraviolet-cured resin, secondary coating layer, and colored layer where the colored layer intermittently does not coat the secondary coating layer at a portion in the direction of the circumference.

The Applicant observes that also this fibre has the drawback that it cannot be "upjacketed" with a tight-buffer coating which would hinder dissipation of the light energy escaping the second coating material.

I. A. Davies et al. ("Optical fibres resilient to failure in bending under high power", ECOC 2005 Proceedings, Vol. 3, 471-472) propose a reduced refractive index acrylate inner primary coating for overcoming the failure mode due to simultaneous high power and tight bending. However, although the greatest resistance to this failure mode is provided by the coating with lowest refractive index, the Authors suggest that an intermediate index may be practically advantageous considering the protection of networks elements downstream from the bend.

The Applicant thus noticed that there remains a need for an optical fibre "upjacketed" with a tight-buffer coating not hindering dissipation of the light energy escaping the second coating material and/or dissipation of heat energy derived therefrom.

US 2003/0133679 relates to an optical fibre including a glass or plastic core (or waveguide), a cladding on the waveguide, a primary coating on the cladding and a secondary coating on the primary coating. The optical fibre is coated with a flame retardant tight-buffer coating composition. The tight-buffer coating can be halogen-free or substantially halogen-free. Halogen-free flame retardants that have been found to be useful are flame retardant plasticizers and flame retardant acrylate oligomers.

U.S. Pat. No. 6,215,931 relates to flexible thermoplastic polyolefin elastomers for buffering a telecommunication cable element. Said thermoplastic polyolefin material may also contain organic or inorganic fillers. A reduction in the density of the material is advantageous because it allows for a reduction in cable weight. The buffer material is halogen free and can be made flame retardant.

The Applicant faced the problem of protecting the optical fibres from damages arising from heat originated inside the fibre by light transported therethrough. In particular, the Applicant faced the problem of providing this kind of protection by means of a solution applicable to an optical fibre without of changing the chemical or physical features of the at least one exterior coating or coatings and/or of the cladding layer of the fibre.

The Applicant perceived that the function of protecting the fibre from the said internally generated heat could be performed by a buffer coating made of a material endowed with specific physical properties.

SUMMARY OF THE INVENTION

The present invention relates to a buffered optical fibre comprising a tight-buffer coating and a method for improving the lifetime thereof, even under high power and/or in the presence of small diameter bend.

The Applicant has observed that a buffer applied over the fibre not only does not hinder the heat dissipation, but rather it helps transferring the heat to the exterior of the without causing undesired overheating in the fibre, provided that such buffer is made of a material capable of withstanding the temperature and of effectively transmitting the heat.

The lifetime of an optical fibre can be improved by providing a tight-buffer coating with a density greater than a predetermined value, in combination with a thermal conductivity higher than a predetermined value. Another physical property useful for characterizing a tight buffer coating material capable of removing energy from an optical fibre is the thermal diffusivity.

In the present description claims, as

"high power" is intended a transmission signal having a power of at least 0.15 W, e.g. of 1 or 2 W;

"small diameter bend" is intended a U-bend having a radius equal to or lower than 15 mm; typically, said radius can be of from 12 to 4 mm;

"density" is intended the ratio of mass to volume; the unit of measurement is $Kg/dm^3$;

"thermal diffusivity" is intended the ratio of thermal conductivity to volumetric heat capacity; the unit of measurement is $m^2/(sec \cdot 10^{-6})$; the thermal diffusivity is the measure of the way heat flows through a material to the other side; the thermal diffusivity also provides indication of the capability of a material to adjust its own temperature to that of the surroundings;

"thermal conductivity" is intended the physical property of a material that denotes its ability to transfer heat through its thickness; the unit of measurement is $W/m \cdot K$;

"single-mode fibre" is intended an optical fibre through which only one mode will propagate as defined in ITU-T G.652. B;

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

BRIEF DESCRIPTION OF THE DRAWINGS

The accompanying drawings are incorporated in and constitute a part of this specification. The drawings illustrate exemplary embodiments and, together with the description, serve to explain some principles of the invention. In the drawings.

DETAILED DESCRIPTION OF THE INVENTION

Figure 1:
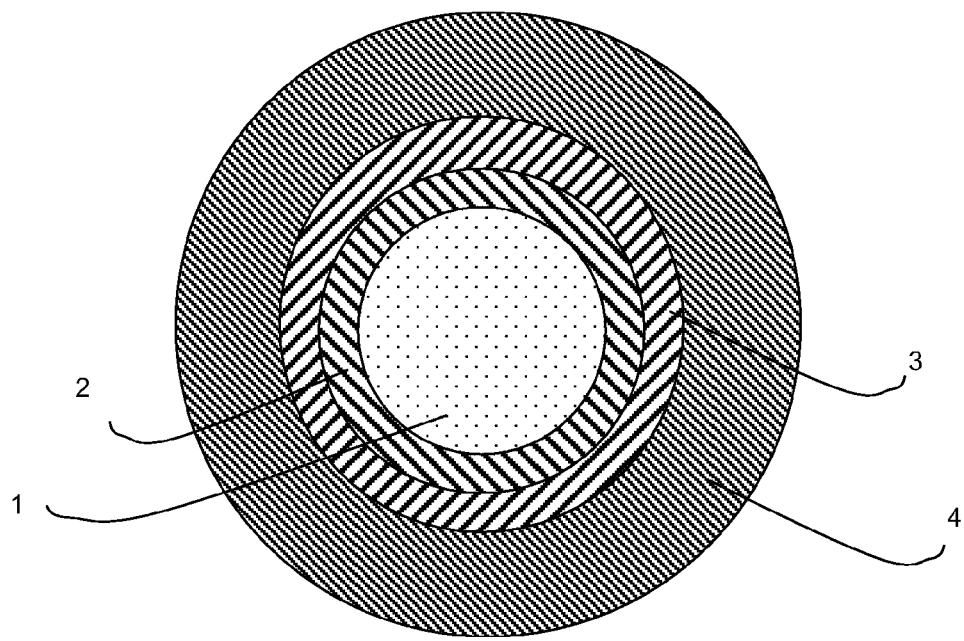
FIG. 1 is a schematic view of an exemplary buffered optical fibre.

In a first aspect, the present invention provides a buffered optical fibre comprising an optical waveguide, at least one exterior coating surrounding said optical waveguide and a buffer coating surrounding said at least one exterior coating, wherein the said buffer coating is a tight buffer made of a material having a density of at least $1.2 \, Kg/dm^3$ and a thermal conductivity of at least $0.4 \, W/m \cdot K$.

Preferably, the density of the coating material is of from 1.2 to $1.7 \, Kg/dm^3$.

More preferably, the density of the coating material is of from 1.4 to $1.6 \, Kg/dm^3$.

Preferably, the thermal conductivity of the coating material is of from 0.4 to $0.8 \, W/mK$, more preferably of from 0.6 to $0.75 \, W/mK$.

Advantageously, the coating material of the tight buffer coating according to the invention has a thermal diffusivity of at least $0.2 \, m^2/(sec \cdot 10^{-6})$.

More preferably, the thermal diffusivity of the coating material is of from 0.2 to $0.3 \, m^2/(sec \cdot 10^{-6})$.

Preferably, the optical waveguide according to the invention is a single-mode fibre Preferably, the optical waveguide of the present invention is a glass fibre including a glass core surrounded by a glass cladding.

The tight buffer coating of the present invention can have a thickness such to provide a buffered optical fibre with a diameter of from 650 to 1000 μm, more preferably of from 800 to 900 μm.

Advantageously, the tight buffer coating material of the invention comprises a polymeric matrix and an inorganic filler.

Preferably, the polymeric matrix is selected from the group comprising polyethylene, polypropylene, ethylene-propylene copolymer, polymers and copolymers of $C_2$ to $C_8$ olefins (α-olefin) such as polybutene, poly(4-methylpentene-1) or the like, copolymers of these olefins and diene, ethylene-acrylate copolymer, polystyrene, ABS resin, AAS resin, AS resin, MBS resin, vinyl acetate resin, phenoxy resin, polyacetal, polyamide, polyimide, polycarbonate, polysulfone, polyphenylene oxide, polyphenylene sulfide, polyethylene terephthalate, polybutylene terephthalate, methacrylic resin, and mixture thereof.

In a preferred embodiment, said polymeric matrix is selected from the group consisting of polymers and copolymers of $C_2$ to $C_8$ olefins (α-olefin), ethylene-vinyl acetate copolymer resin, ethylene-butyl acrylate copolymer resin, and mixture thereof.

More preferred are polypropylene-based resins such as polypropylene homopolymers and ethylene-propylene copolymers; polyethylene-based resins such as high-density polyethylene, low-density polyethylene, straight-chain low-density polyethylene, ultra low-density polyethylene, EVA (ethylene-vinyl acetate resin), EEA (ethylene-ethyl acrylate resin), EBA (ethylene-butyl acrylate resin), EMA (ethylene-methyl acrylate copolymer resin), EAA (ethylene-acrylic acid copolymer resin) and ultra high molecular weight polyethylene; and polymers and copolymers of $C_2$ to $C_6$ olefins (α-olefin) such as polybutene and poly(4-methylpentene-1).

Optionally, thermosetting resins such as epoxy resin, phenol resin, melamine resin, unsaturated polyester resin, alkyd resin and urea resin and synthetic rubbers such as EPDM, butyl rubber, isoprene rubber, SBR, NIR, urethane rubber, polybutadiene rubber, acrylic rubber, silicone rubber, and NBR are included.

Preferably, the inorganic filler is selected from inorganic oxides and hydroxides, for example aluminum hydroxide and magnesium hydroxide, and mixtures thereof.

Advantageously, the magnesium hydroxide is a synthetic magnesium hydroxide.

As used herein and in the claims the expression "synthetic magnesium hydroxide" is intended to mean a magnesium hydroxide in form of flattened hexagonal crystallites substantially uniform both in size and morphology. Such a product may be obtained by various synthetic routes involving the addition of alkalis to an aqueous solution of a magnesium salt and subsequent precipitation of the hydroxide by heating at high pressure (see for example U.S. Pat. No. 4,098,762 or EP-780,425 or U.S. Pat. No. 4,145,404).

Advantageously, the amount of inorganic filler is of at least 30% by weight, preferably of from 50% to 80% by weight, relative to the total weight of the coating material composition.

With the aim of improving compatibility between inorganic filler and polymer matrix, a coupling agent is preferably added. In the case the inorganic filler comprises at least an hydroxide, a coupling agent capable of increasing the interaction between the hydroxyl groups of and the polyolefin chains may be added to the mixture. This coupling agent can be selected from: saturated silane compounds or silane compounds containing at least one ethylenic unsaturation; epoxides containing an ethylenic unsaturation; monocarboxylic acids or, preferably, dicarboxylic acids having at least one ethylenic unsaturation, or derivatives thereof, in particular anhydrides or esters.

Preferred silane compounds suitable for this purpose are: γ-meth-acryloxypropyl-trimethoxysilane, methyltriethoxysilane, methyltris(2-methoxyethoxy)silane, dimethyldiethoxysilane, vinyltris(2-methoxyeth-oxy)-silane, vinyltrimethoxysilane, vinyl-triethoxysilane, octyltriethoxysilane, isobutyl-triethoxysilane, isobutyltrimethoxysilane and mixtures thereof.

Preferred epoxides containing an ethylenic unsaturation are: glycidyl acrylate, glycidyl methacrylate, monoglycidyl ester of itaconic acid, glycidyl ester of maleic acid, vinyl glycidyl ether, allyl glycidyl ether, or mixtures thereof.

Preferred monocarboxylic or dicarboxylic acids, having at least one ethylenic unsaturation, or derivatives thereof, as coupling agents are, for example: maleic acid, maleic anhydride, fumaric acid, citraconic acid, itaconic acid, acrylic acid, methacrylic acid and the like, and anhydrides or esters derived therefrom, or mixtures thereof. Maleic anhydride is particularly preferred.

The coupling agents can be used as such or pre-grafted onto a polyolefin, for example polyethylene or copolymers of ethylene with an alpha-olefin, by means of a radicalic reaction (see for example patent EP-530,940). The amount of grafted coupling agent is generally of from 0.05 to 5 parts by weight, preferably of from 0.1 to 2 parts by weight, with respect to 100 parts by weight of polyolefin.

Polyolefins grafted with maleic anhydride are available as commercial products known, for example, under the trademarks Fusabond® (Du Pont), Orevac® (Elf Atochem), Exxelor® (Exxon Chemical), Yparex® (DSM).

Alternatively, the coupling agents of carboxylic or epoxide type mentioned above (for example maleic anhydride) or the silanes with ethylenic unsaturation (for example vinyltrimethoxysilane) may be added to the mixture in combination with a radical initiator so as to graft the compatibilizing agent directly onto the polymer matrix. An organic peroxide such as tert-butyl perbenzoate, dicumyl peroxide, benzoyl peroxide, di-tert-butyl peroxide and the like can, for example, be used as initiator.

The amount of coupling agent that can be added to the mixture can vary mainly depending on the type of coupling agent used and on the amount of inorganic filler added, and is generally of from 0.01% to 5%, preferably of from 0.05% to 2%, by weight relative to the total weight of the base polymer mixture.

Other conventional components such as antioxidants, processing coadjuvants, lubricants, pigments, other fillers and the like can be added to the buffer coating material of the present invention.

Conventional antioxidants which are suitable for this purpose are, for example: polymerized trimethyldihydroquinoline, 4,4'-thio-bis(3-methyl-6-tert-butyl)phenol; pentaerythritol tetrakis[3-(3,5-di-tert-butyl-4-hydroxy-phenyl)propionate], 2,2'-thio-diethylene-bis-[3-(3,5-di-tert-butyl-4-hydroxy-phenyl)propionate] and the like, or mixtures thereof.

Other fillers which may be used in the present invention include, for example, glass particles, glass fibres, calcined kaolin, talc and the like, or mixtures thereof. Processing coadjuvants usually added to the polymer base are, for example, calcium stearate, zinc stearate, stearic acid, paraffin wax, silicone rubbers and the like, or mixtures thereof.

The buffered optical fibre of the invention can comprise at least one exterior coatings. Preferably, the buffered optical fibre of the invention comprises two exterior coatings which in the following of the description could also be referred to as first and second coating, the second coating being radially external to the first one.

Advantageously, a first exterior coating suitable for the present invention can be made from a radiation curable coating composition comprising a radiation curable oligomer, said oligomer comprising a backbone derived from polypropylene glycol and a dimer acid based polyester polyol. Preferably, the oligomer is a urethane acrylate oligomer comprising said backbone, more preferably a wholly aliphatic urethane acrylate oligomer.

Advantageously, the polymeric material of said second exterior coating is also based on a radiation curable composition, preferably compatible with the first coating formulation. For example, if the first exterior primary coating has an acrylic base, the second exterior coating shall preferably have an acrylic base, too.

In an embodiment of the present invention, the diameter of the optical waveguide can be of from 120 μm to 130 μm. The thickness of the first exterior coating can be of from 25 μm to 35 μm, while the thickness of the second exterior coating typically can be of from 10 μm to 30 μm.

In another embodiment of the invention, the diameter of the optical waveguide can be of from 120 µm to 130 µm. The thickness of the first coating 2 can be of from 18 µm to 28 µm, preferably of 22-23 µm, while the thickness of the second coating 3 can be of from 10 µm to 20 µm, preferably of 15 µm.

In a second aspect, the present invention provides a method for controlling the heat dispersion from an optical fibre, comprising an optical waveguide, by providing the optical fibre with a buffer coating in direct contact with said optical fibre, said buffer coating being made of a coating material having a density of at least 1.2 Kg/dm$^3$ and a thermal conductivity of at least 0.4 W/m·K.

In another aspect the present invention relates to the use of a material having a density of at least 1.2 Kg/dm$^3$ and a thermal conductivity of at least 0.4 W/m·K as energy removing tight buffer coating for a buffered optical fibre.

Preferably, the density of the coating material is of from 1.2 to 1.7 Kg/dm$^3$.

More preferably, the density of the coating material is of from 1.4 to 1.6 Kg/dm$^3$.

Preferably, the thermal conductivity of the coating material is of from 0.4 to 0.8 W/mK, more preferably of from 0.6 to 0.75 W/mK.

Advantageously, the coating material of the tight buffer coating according to the invention has a thermal diffusivity of at least 0.2 m$^2$/(sec·10$^{-6}$).

More preferably, the thermal diffusivity of the coating material is of from 0.2 to 0.3 m$^2$/(sec·10$^{-6}$).

Advantageously, the above described material is used as tight buffer coating with a thickness such to provide a buffered optical fibre with a diameter of from 650 to 1000 µm, more preferably of from 800 to 900 µm.

Advantageously, the tight buffer coating material of the invention comprises a polymeric matrix and an inorganic filler.

Figure 2:
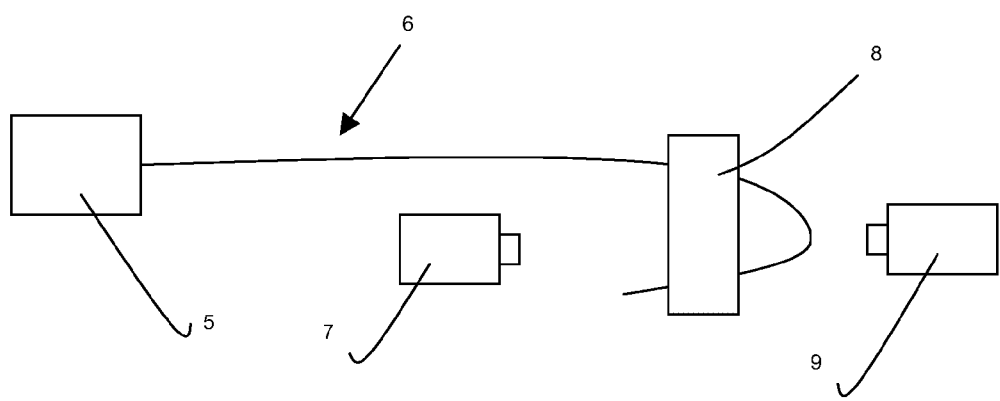
FIG. 2 illustrates an experimental set-up used to investigate the behavior of the exemplary buffered optical fibre of FIG. 1.

The present invention shall be further described with reference to the following examples and figures wherein:

FIG. 1 schematically shows a buffered optical fibre according to the invention:

FIG. 2 shows the experimental set-up used to investigate the behavior of a buffered optical fibre.

As from FIG. 1, a buffered optical fibre according to the invention comprises a glass optical waveguide 1 (core+cladding), a first exterior coating 2, also known as primary coating, disposed to surround said waveguide 1, and a second exterior coating 3, also known as secondary coating, disposed to surround said first coating 2. A tight buffer coating 4 is disposed to surrounding direct contact said second exterior coating 3.

The diameter of the optical fibre is of 250 µm with a first exterior coating thickness of 32.5 µm, while the thickness of the second exterior coating typically can be of from 27.5 µm.

In another embodiment of the invention, the thickness of the exterior first and second coating can be reduced to an overall diameter of 200 µm. In such case the thickness of the first coating 2 can be of 22-23 µm, while the thickness of the second coating 3 can be of 15 µm.

Typically, the thickness of the tight buffer coating 4 is such to bring the buffered optical fibre diameter to a value of 0.8 or 0.9 mm.

For example, the first coating 2 is made from a radiation curable composition comprising a radiation curable oligomer as disclosed by WO 01/05724.

An example of a formulation usable as the second coating of the invention is that marketed under the name of DeSolite® 3471-2-136 (DSM).

The buffered optical fibre of the invention can be manufactured according to known techniques. For example, the manufacturing process can be carried out in two steps, the first one comprising the sub-steps of drawing the optical waveguide and coating it with at least one exterior coating. At the end of this first step the resulting unbuffered optical fibre is collected on a reel and prepared for the second step. Said second step comprises the deposition of the tight buffer coating, for example, by extrusion.

Examples of parameters for carrying out the extrusion of the tight buffer of the invention are as follows:
tip inner diameter 0.35 mm
tip outer diameter 0.45 mm
conic die inner diameter 0.85 mm (for 0.8 mm buffered fibre)
conic die inner diameter 0.95 mm (for 0.9 mm buffered fibre)
line speed: 100 m/min
thermal profile: Zone 1:150° C./Zone 2:160° C./Zone 3:170° C./Collar: 180° C./Head: 180° C./Die: 180° C.
Cooling trough: 9 m water at 25° C.
fibre pay off tension: 60 g
Buffered fibre take up tension: 150 g

EXAMPLE 1

Composition 1-4

Tight buffer coating materials according to the invention were made as set forth in Table 1.

TABLE 1

|  | Comp. 1 | Comp. 2 | Comp. 3* | Comp. 4* |
|---|---|---|---|---|
| Escorene ™ UL | 70 | 85 | — | — |
| LLPDE | 20 | 15 | — | — |
| Kisuma ™ 5-A | 160 | — | — | — |
| Martinal ™ OL-107/LE | — | 180 | — | — |
| Maleic anhydride grafted-EPR | 20 | — | — | — |
| 3-Aminopropyltri-ethoxysilane | — | 1.5 | — | — |
| Vestamide ™ 1670 | — | — | 100 | — |
| Grilamid ™ L 20 LF | — | — | — | — |

Escorene ™ UL = Ethylene vinyl-acetate with 19% vinylacetate (by ExxonMobil);
Kisuma ™ 5-A = synthetic magnesium hydroxide (by KYOWA Chemical Industry Co., LTD);
Martinal ™ OL-107/LE = aluminium hydroxide (by Albemarle);
Vestamide ™ 1670 = polyamide 12;
Grilamid ™ L 20 LF = graphite filled polyamide 12.

The amount of the material is provided in phr

Composition 3 and 4 are provided as comparison.

In the following Table 2 some properties of the compositions of Table 1 are set forth.

TABLE 2

|  | Comp. 1 | Comp. 2 | Comp. 3* | Comp. 4* |
|---|---|---|---|---|
| Density (Kg/dm$^3$) | 1.48 | 1.53 | 1.01 | 1.08 |
| Thermal diffusivity [m$^2$/(sec · 10$^{-6}$)] | 0.236 | 0.217 | 0.106 | 0.142 |
| Thermal conductivity (W/mK) | 0.681 | 0.624 | 0.290 | 0.350 |

EXAMPLE 2

Analysis of Buffered Optical Fibre Failures

Buffered optical fibres were tested by the set-up described by I. M. Davies et al. supra, and sketched in FIG. 2. The buffered optical fiber (6) to be tested was connected to a laser (5) with an output power of 1 W and positioned with a minimum bend radius of 4 mm by a bending device (8). The heating of the curved portion of the buffered optical fiber was measured by a thermo camera (9) while the appearance of buffered the optical fibre during the test was recorded by an imaging camera (7). The maximum temperature reached by the fibres and the behavior thereof were measured.

Two commercial optical fibres SM Light (by Prysmian Cavi e Sistemi Telecom) with DeSolite® 3471-1-129 as first exterior coating and DeSolite® 3471-2-136 as second exterior coating were tested according to the set-up discussed above. The first one (F1) was provided with a loose buffer coating made with the composition 1 of Example 1, while the second one (F2) was provided with a tight buffer coating (final diameter: 900 µm) made with the same composition.

The two buffered fibres were tested in the set-up cited above. F1 burnt after 3 hours, while F2 resulted just plasticized, i.e. softened to the point of becoming moldable, but with no substantial impairment of the shape, 20 hours.

The experiment showed that a loose buffer coated fibre is not able to withstand the amount of dissipated power provided in the test, while the tight buffer coated fibre is capable to withstand the experimental conditions with only negligible change of the buffer which would not jeopardize the further operation of the fibre.

A possible interpretation of such test results is that the tight buffer coating with the selected density and thermal conductivity values, is capable of allowing the heat internally generated by the high transmission power to be dissipated outside of the fibre, while the loose buffer construction provides a sort of thermal insulation to the fibre, resulting in the coating overheating and burning.

The same kind of commercial optical fibre as above was provided with a tight buffer coating (final diameter: 900 µm) made with the composition 3 of Example 1 (F3), and tested according to the set-up discussed above. The buffer coating of F3 melted shortly and burnt after 1.5 hour.

A number of different tight buffered optical fibres were tested according to the set-up discussed above and the results are set forth in the following Table 3.

Irrespective from the characteristics of the external coating or coatings, optical fibres buffered with a tight buffer according to the invention are capable to withstand high power while in small bend configuration without substantial damages such as melting of the buffer layer or burnt.

The invention claimed is:

1. A buffered optical fibre comprising an optical waveguide, at least one exterior coating surrounding said optical waveguide and a buffer coating surrounding said at least one exterior coating, wherein said buffer coating is a tight buffer coating made of a material having a density of at least about 1.2 Kg/dm$^3$ and a thermal conductivity of at least about 0.4 W/m·K, and wherein the tight buffer coating material consists essentially of a polymeric matrix selected from polymers and copolymers of $C_2$ to $C_8$ olefins (α-olefin), ethylene-vinyl acetate copolymer resin, ethylene-butyl acrylate copolymer resin, and mixtures thereof and an inorganic filler selected from inorganic oxides and hydroxides.

2. The buffered optical fibre according to claim 1, wherein the density of the coating material is about 1.2 to about 1.7 Kg/dm$^3$.

3. The buffered optical fibre according to claim 2, wherein the density of the coating material is about 1.4 to about 1.6 Kg/dm$^3$.

4. The buffered optical fibre according to claim 1, wherein the thermal conductivity of the coating material is about 0.4 to about 0.8 W/mK.

5. The buffered optical fibre according to claim 4, wherein the thermal conductivity of the coating material is about 0.6 to about 0.75 W/mK.

6. The buffered optical fibre according to claim 1, wherein the coating material of the tight buffer coating has a thermal diffusivity of at least about 0.2 m$^2$/(sec·10$^{-6}$).

7. The buffered optical fibre according to claim 6, wherein the thermal diffusivity of the coating material is about 0.2 to about 0.3 m$^2$/(sec·10$^{-6}$).

8. The buffered optical fibre according to claim 1, wherein the optical waveguide is a single-mode fibre.

TABLE 3

| Buffered optical fibre | Buffer Composition 1 (900 µm) | Buffer Composition 2 (900 µm) | Buffer Composition 3 (900 µm) | Buffer Composition 4 (900 µm) |
|---|---|---|---|---|
| SM Light (1) | Plasticized after 20 hours | Plasticized after 20 hours | Melted in short, burnt after 1.5 hour | |
| SF-SMF | Plasticized after 20 hours | | | |
| Allwave ™ | Plasticized after 20 hours | | | |
| Anywave ® Optomagic | Plasticized after 20 hours | | | |
| SMF28 ™ Corning | Plasticized after 20 hours | | | |
| SM Light (2) | Plasticized after 20 hours | Plasticized after 20 hours | Melted in short, burnt after 4 hour | Melted and burnt in short |

SM Light (1): with DeSolite ® 3471-1-129 as first exterior coating and DeSolite ® 3471-2-136 as second exterior coating (by Prysmian Cavi e Sistemi Telecom);
SF-SMF: by Samsung;
Allwave ™: by Lucent Technologies;
Anywave ®: low water peak single mode fibre by Optomagic;
SMF28 ™: single mode optical fibre by Corning;
SM Light (2): with DeSolite ® 6D1-78 as first exterior coating and DeSolite ® 3471-2-136 as second exterior coating (by Prysmian Cavi e Sistemi Telecom)

9. The buffered optical fibre according to claim 1, wherein the tight buffer coating has a thickness sufficient to provide a buffered optical fibre with a diameter of about 450 to about 1000 μm.

10. The buffered optical fibre according to claim 9, wherein the tight buffer coating has a thickness sufficient to provide a buffered optical fibre with a diameter of about 800 to about 900 μm.

11. The buffered optical fibre according to claim 1, wherein the tight buffer coating material comprises a polymeric matrix and an inorganic filler.

12. The buffered optical fibre according to claim 11, wherein the polymeric matrix is selected from the group comprising polyethylene, polypropylene, ethylene-propylene copolymer, polymers and copolymers of $C_2$ to $C_8$ olefins, α-olefin, copolymers of $C_2$ to $C_8$ olefins, α-olefin, and diene, ethylene-acrylate copolymer, polystyrene, ABS resin, AAS resin, AS resin, MBS resin, vinyl acetate resin, phenoxy resin, polyacetal, polyamide, polyimide, polycarbonate, polysulfone, polyphenylene oxide, polyphenylene sulfide, polyethylene terephthalate, polybutylene terephthalate, methacrylic resin, and mixtures thereof.

13. The buffered optical fibre according to claim 1, wherein the inorganic filler is aluminium hydroxide, magnesium hydroxide, or mixtures thereof.

14. The buffered optical fibre according to claim 13, wherein the inorganic filler is magnesium hydroxide or a synthetic magnesium hydroxide.

15. The buffered optical fibre according to claim 11, wherein the inorganic filler is an amount of at least about 30% by weight relative to the total weight of the coating material composition.

16. The buffered optical fibre according to claim 15, wherein the inorganic filler is about 50% to about 80% by weight relative to the total weight of the coating material composition.

17. The buffered optical fibre according to claim 1, comprising a first exterior coating made from a radiation curable coating composition comprising a radiation curable oligomer, said oligomer comprising a backbone derived from polypropylene glycol and a dimer acid based polyester polyol.

18. The buffered optical fibre according to claim 1, comprising a second exterior coating made of a radiation curable composition compatible with a first coating material.

19. The buffered optical fibre according to claim 1, wherein the optical waveguide has a diameter of about 120 μm to about 130 μm.

20. The buffered optical fibre according to claim 17, wherein the first exterior coating has a thickness of about 25 μm to about 35 μm.

21. The buffered optical fibre according to claim 18, wherein the second exterior coating has a thickness of about 10 μm to about 30 μm.

22. The buffered optical fibre according to claim 17, wherein the first exterior coating has a thickness of about 18 μm to about 28 μm.

23. The buffered optical fibre according to claim 18, wherein the second exterior coating has a thickness of about 10 μm to about 20 μm.

24. A method for controlling the heat dispersion from an optical fibre, comprising an optical waveguide, comprising providing the optical fibre with a buffer coating in direct contact with said optical fibre, said buffer coating being made of a coating material having a density of at least about 1.2 $Kg/dm^3$ and a thermal conductivity of at least about 0.4 W/m·K, and wherein the coating material consists essentially of a polymeric matrix selected from polymers and copolymers of $C_2$ to $C_8$ olefins (α-olefin), ethylene-vinyl acetate copolymer resin, ethylene-butyl acrylate copolymer resin, and mixtures thereof and an inorganic filler selected from inorganic oxides and hydroxides.

25. A method of making an energy removing tight buffer coating for a buffered optical fibre comprising applying a material having a density of at least about 1.2 $Kg/dm^3$ and a thermal conductivity of at least about 0.4 W/m·K as the energy removing tight buffer coating on an optical fibre, and wherein the material consists essentially of a polymeric matrix selected from polymers and copolymers of $C_2$ to $C_8$ olefins (α-olefin), ethylene-vinyl acetate copolymer resin, ethylene-butyl acrylate copolymer resin, and mixtures thereof and an inorganic filler selected from inorganic oxides and hydroxides.

26. The method according to claim 25, wherein the material has a density of about 1.2 to about 1.7 $Kg/dm^3$.

27. The method according to claim 26, wherein the material has a density of about 1.4 to about 1.6 $Kg/dm^3$.

28. The method according to claim 25, wherein the material has a thermal conductivity of about 0.4 to about 0.8 W/mK.

29. The method according to claim 28, wherein the material has a thermal conductivity of about 0.6 to about 0.75 W/mK.

30. The method according to claim 25, wherein the material has a thermal diffusivity of at least about 0.2 $m^2/(sec \cdot 10^{-6})$.

31. The method according to claim 30, wherein the material has a thermal diffusivity of about 0.2 to about 0.3 $m^2/(sec \cdot 10^{-6})$.

32. The method according to claim 25, wherein the thickness of the tight buffer coating is sufficient to provide a buffered optical fibre with a diameter of about 650 to about 1000 μm.

33. The method according to claim 32, wherein the thickness of the tight buffer coating is sufficient to provide a buffered optical fibre with a diameter of about 800 to about 900 μm.

* * * * *